United States Patent [19]
Böhmler

[11] Patent Number: 5,529,335
[45] Date of Patent: Jun. 25, 1996

[54] GAS GENERATOR FOR A VEHICLE OCCUPANT RESTRAINT SYSTEM

[75] Inventor: Klaus Böhmler, Schwäbisch-Gmünd, Germany

[73] Assignee: TRW Repa GmbH, Alfdorf, Germany

[21] Appl. No.: 428,578

[22] Filed: Apr. 25, 1995

[30] Foreign Application Priority Data

May 2, 1994 [DE] Germany .................. 44 15 373.2

[51] Int. Cl.⁶ .................................................. B60R 21/26
[52] U.S. Cl. ................................ 280/741; 280/728.1
[58] Field of Search ............................................... 280/741

[56] References Cited

U.S. PATENT DOCUMENTS

| | | | |
|---|---|---|---|
| 5,048,862 | 9/1991 | Bender et al. | 280/741 |
| 5,109,772 | 5/1992 | Cunningham et al. | 280/741 |
| 5,259,644 | 11/1993 | Albrecht et al. | 280/741 |
| 5,268,013 | 12/1993 | Bruncher et al. | 280/741 |
| 5,301,979 | 4/1994 | Allard | 280/741 |

FOREIGN PATENT DOCUMENTS

| | | |
|---|---|---|
| 0168588 | 1/1986 | European Pat. Off. . |
| 0560181 | 9/1993 | European Pat. Off. . |
| 0567113 | 10/1993 | European Pat. Off. . |
| 0585612 | 3/1994 | European Pat. Off. . |
| 4234276 | 11/1993 | Germany . |

*Primary Examiner*—Kenneth R. Rice
*Attorney, Agent, or Firm*—Tarolli, Sundheim, Covell, Tummino & Szabo

[57] ABSTRACT

A gas generator for a vehicle occupant restraining system is provided with an ignitor with a propelling charge container containing two charges with different speeds of combustion. The container has a bottom with an aperture, which is normally closed by a blow-out diaphragm. The propelling charge with the lower speed of combustion is arranged in a first chamber exposed to the ignitor. A second chamber containing the propelling charge with the higher speed of combustion is partitioned off by an internal tubular blow-out wall, adapted to be consumed as combustion of the first charge progresses.

11 Claims, 4 Drawing Sheets

GAS GENERATOR FOR A VEHICLE OCCUPANT RESTRAINT SYSTEM

The invention relates to a gas generator for a vehicle occupant restraint system comprising an ignitor and a pyrotechnical propelling charge.

Such a gas generator is intended to be used in a pretensioner of a safety belt system. When the pyrotechnic charge is ignited following impact of the vehicle, a drive unit is subjected to the pressure due to the combustion gases. Because of the explosion-like combustion of the propelling charge the movable parts of the drive unit will be subjected to extreme acceleration forces.

An object of the invention is to provide a gas generator wherein stresses to which the mechanical parts are of the drive unit subjected is reduced and the power of the generator is more effectively utilized.

According to a first aspect of the invention a gas generator is provided which comprises a housing, a first pyrotechnical charge accomodated in a first chamber defined within the housing, a second pyrotechnical charge accomodated in a second chamber defined within the housing, and an ignitor accomodated in a third chamber defined in the housing and communicating with the first chamber. The first pyrotechnical charge has a velocity of combustion lower than that of the second pyrotechnical charge. The first and second chambers are separated from each other by a consumable partition wall which is destroyed upon combustion of the first pyrotechnical charge.

Owing to this design there is a lower initial increase in pressure so that the movable parts of the drive unit subjected to the pressure are initially only accelerated to a slight degree. This initial phase, in which there is a relatively slow increase in pressure, is followed by a phase with a relatively steep increase in pressure so that one may be certain of a rapid, reliable drive of the restraining system. The initial, relatively slow increase in pressure is determined by the gases of combustion, which are initially produced during the combustion of the propelling charge with the lower speed of combustion. A relatively thin blow-out diaphragm at the bottom of the housing is practically burst directly after the igniting of the propelling charge with the lower speed of combustion. After the bursting of the diaphragm the drive unit is exposed through the uncovered aperture firstly to a relatively slowly increasing pressure. As combustion of the charge responsible for the slower increase in pressure proceeds the blow-out wall is burst following a respective build up of pressure so that the propelling charge with the higher speed of combustion is ignited, preferably by the first propelling charge in order to act in the second phase on the drive unit with a suitably more rapidly increasing pressure. By an adequate choice of the two propelling charges with the lower and, respectively, the higher speed of combustion it is possible to set the slope of the slow and, respectively, rapid increase in pressure according to the respective requirements and to set the point in time at which the pressure maximum is reached. Thus it is for instance possible, despite the initial phase with a relatively slow increase in pressure for the pressure maximum to be reached at a relatively early point in time.

The blow-out wall is preferably constituted by an internal tube extending between the ignitor and the blow-out diaphragm and preferably so positioned that at one end it is exposed to the ignitor and at the other end is closed by the blow-out diaphragm. Accordingly firstly the ignitor initially solely ignites the propelling charge with the lower speed of combustion. Once the blow-out diaphragm has ruptured following the build up in pressure, there will be a connection with the drive unit. The drive unit will initially be subjected to a relatively slow increase in pressure. The ignition of the propelling charge with the higher rate of combustion only takes place when in the course of combustion of the propelling charge with the lower velocity of combustion the internal tube as well is also destroyed.

The propelling charge with the lower velocity of combustion may be positioned within the internal tube. In this case such internal tube is preferably designed to be integral with the propelling charge receiving means.

In accordance with a further advantageous embodiment of the invention the charge with the lower speed of combustion is constituted by the internal tube itself, which for this purpose may consist of a solid propelling charge.

A reliable way of holding and aligning the internal tube in the gas generator is preferably achieved by the insertion of the tube end, which is adjacent to the blow-out diaphragm of the charge receiving means, in an annular base of the charge receiving means, whereas its end adjacent to the ignitor is preferably inserted in the ignition channel of the ignitor. In this case as well the propelling charge with the lower speed of combustion is in this way ignited by the ignitor firstly. Ignition of the further propelling charge only takes place after the internal tube having burned right through. The annular base may for its part be formed integrally with the propelling charge receiving means.

According to a second aspect of the invention, a gas generator is provided which comprises a housing, an envelope accomodated in the housing, a pyrotechnical charge accomodated in the envelope and an ignitor accomodated in a chamber of the housing communicating with the envelope. The housing has a bottom opposite the chamber and closed by a blow-out diaphragm. The blow-out diaphragm has a first, relatively thin wall portion and a second wall portion of a substantially greater wall thickness than the first wall portion.

In this alternative embodiment of the invention as well there will be, after bursting of the thinner portion of the blow-out diaphragm, an initial phase with merely a relatively slow increase in pressure. This is to be attributed to the fact that on bursting of the diaphragm firstly only a relatively small nozzle is opened up. As this initially relatively small hole is enlarged by the combustion process, the increase in pressure will become steeper. The nozzle will grow in size as a function of time. The nozzle, which is initially sealed by the blow-out diaphragm, may more particularly be constituted by a sort of variable thickness bottomwall of the propelling charge receiving means, the time function of the growth in size of the cross section of the hole being preferably given by the course of the internal wall surface of the aperture, whose slope is preferably not constant.

Further advantageous variants of embodiments of the invention are defined in the dependent claims.

Further features and advantages of the invention will be gathered from the following description and from the drawings, to which reference is to be had.

Figure 1:
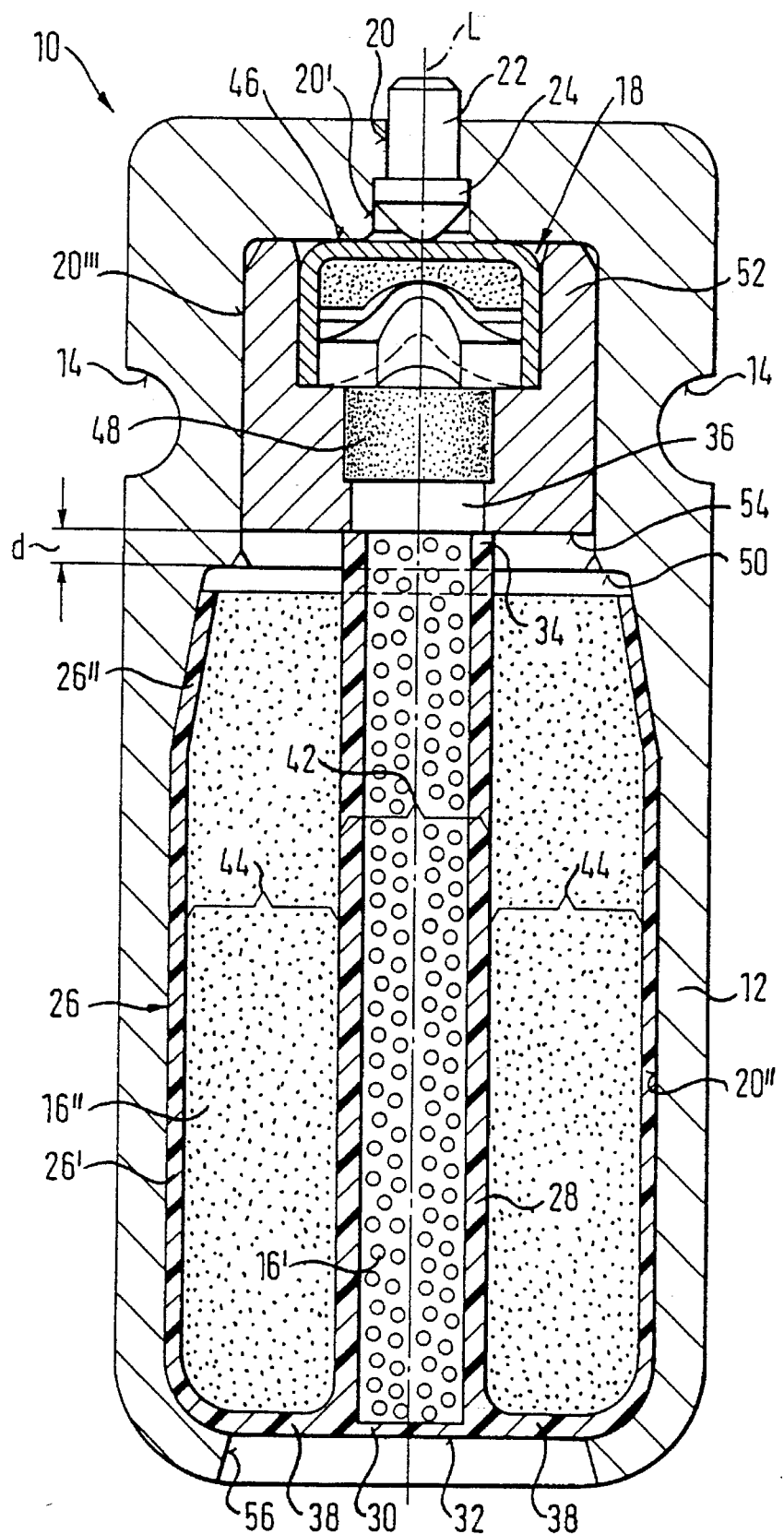
FIG. 1 is a axial section taken through a first embodiment of a pyrotechnical gas generator with two different propelling charges.

The embodiment of a pyrotechnical gas generator 10 illustrated in FIG. 1 has a cylindrical housing 12 with an external receiving means 14 for locking pins (not illustrated) or the like, by means of which the gas generator 10 may be conveniently secured in a bore in a piece of equipment, which may for example be a pretensioner for a vehicle occupant safety belt system.

The gas generator 10 is provided with two propelling charges 16' and 16", which differ as regards their rate of combustion, and an ignitor 18, which in the illustrated embodiment is a mechanical impact ignitor.

The housing 12 of the gas generator 10 has a stepped guide opening 20 opposite to the central portion of an impact surface 46 of the ignitor 18, and a pin-like impact transmission element 22 is received in such guide opening 20. This impact transmission element 22 projects out from the guide opening 20 so that it may be struck by an impact means (not illustrated), which is part of a release, which is for instance mechanical. The pin-like impact transmission element 22 possesses a head 24, which directed to the ignitor 18 is wider but has a point directed toward the ignitor 18, and is received in widened part 20' of the stepped guide opening 20 in order to secure the impact transmission element 22 in the interior. If now the impact part, not illustrated, is driven the against the end, projecting from the housing 12, of the impact transmission element 22, the point of the head 24 will centrally penetrate the impact surface 46 of the ignitor 18 so that the gas generator 10 will be ignited.

The ignitor 18 is connected via an ignition channel 36, which contains a booster 48, with a propelling charge container 26, which is set in the cylindrical housing 12 of the gas generator 10 and which contains both the main propelling charges 16' and 16".

The bowl-like propelling charge container 26, which preferably consists of plastic material, possesses a fairly long cylindrical section 26' adjoining a bottomwall 38 and a shorter section 26" tapering conically toward the ignitor 18. The transition between the cylindrical section 26' of the propelling charge container 26 and the floor surface 38 thereof is rounded. The propelling charge container 26 is press fitted in a suitably designed section 20" of the stepped hole extending through the cylindrical housing 12. In this respect the conically tapered end 26" of the charge container 26 is at a small distance d from a step 50 between the section 20" of larger cross section and the section 20'" of smaller cross section in the stepped bore extending through the housing 12, in which an insert 52 accommodating both the ignitor 18 and also the booster 48 is received. The end 54, which is remote from the ignitor 18 and is adjacent to the propelling charge container 26, of the insert 52 is also set back from the step 50.

The propelling charge container 26 is provided with a central internal tube 28 which is coaxial to the longitudinal axis L common to the cylindrical housing 12 and to the propelling charge container 26, such internal tube 28 being connected with the bottomwall 38 thereof and bordering at the other end on the insert 52. The internal diameter of the internal tube 28 is slightly less than the internal diameter of the coaxial ignition channel 36, while on the contrary the external diameter of the internal tube 28 is slightly larger than internal diameter of the ignition channel 36 so that the respective end of the internal tube has a part of its edge in tight engagement with the front wall surface 54 of the insert 52, which contains the orifice of the ignition channel 36. At the other end the internal tube 28, which is preferably made integrally with the propelling charge container 26, is connected with the floor 38, perpendicular to it, of the charge container 26. The aperture 32 provided at this end of the internal tube 28 is normally sealed by a blow-out wall 30, which is made integrally with the floor 38 and the internal tube 28, such wall 30 being thinner than the part, surrounding the internal tube 28 and the aperture 32, of the bottom-wall 38. The transitional part between the internal tube 28 and the radially outer section of the floor 38 is made with a greater thickness.

At its end adjacent to the blow-out diaphragm 30 the cylindrical housing 12 possesses an outer aperture 56, coaxial to the aperture 32 and, respectively, to the blow-out diaphragm 30, which aperture possesses a larger diameter than the aperture 32, shut by the blow-out diaphragm 30, of the internal tube 28. Via this outer aperture 56 the gas generator 10 is able to be connected with the drive unit of a vehicle occupant restraining system, which may be for instance a pretensioner in a safety belt system which may be arranged both on a belt retractor and incertain also on a belt buckle.

The charge 16' with the lower combustion velocity is arranged in the interior of the internal tube 28 and therefore in a central receiving part 42 of the propelling charge container 26, whereas on the contrary the propelling charge 16" with the higher speed of combustion is accommodated in the receiving part 44, surrounding the internal tube 28, of the propelling charge container 26. Accordingly the receiving part 42 containing the propelling charge with the higher speed of combustion is separated by the central internal tube 28 (which has its end adjacent to the ignitor extending out of the propelling charge container 26) from the receiving part 42 which is shut off from the outside by the blow-out diaphragm 30.

When the ignitor 18 is struck by the impact transmission element 22 then via the booster 48 firstly the propelling charge 16' contained in the internal tube 28 and having a lower speed of combustion, will be let off. After a sufficient increase in pressure in the interior of the tube 28 the blow-out diaphragm 32 will burst so that the opening 30 is opened, through which the drive unit of the respective restraining system, for example a tensioner of a safety belt system, will be actuated. During this phase there will be only a incertain relatively slow increase in pressure so that the load on the mechanical components of the restraining system will be reduced. The internal tube 28, which serves as a blow-out diaphragm, will rupture in the progress of combustion of the propelling charge 16" with the lower speed of combustion so that the propelling charge 16' with a higher speed of combustion will be ignited by the propelling charge 16" which has a lower speed of combustion and which is already burning. Owing to the combustion of the propelling charge 16" with the higher speed of combustion there is a steep increase in pressure, which is responsible for an immediate drive of the restraining system. Owing to the initially smaller increase in pressure the danger of damage and/or impairment of the restraining system is reduced to a minimum.

By the proper selection of the different propelling charges the speeds of pressure rise and the point in time at which the maximum pressure is reached can be defined. The point in time of the transition between the different phases is able to be defined by, inter alia, the thickness and the material of the internal tube, which is preferably formed integral with the propelling charge container and like the same preferably consists of plastic material.

Figure 2:
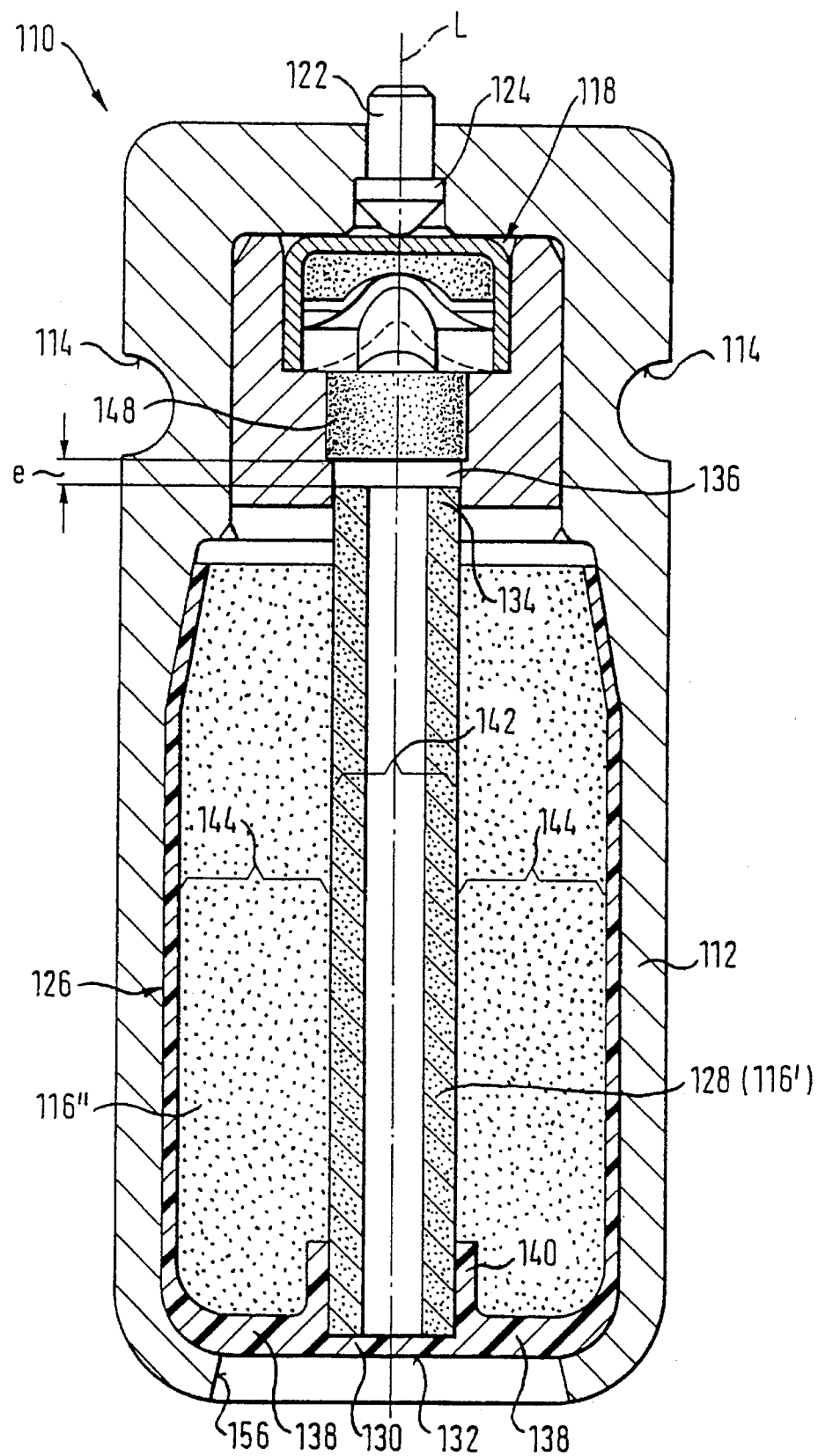
FIG. 2 is an axial section taken through a second embodiment of a pyrotechnical gas generator with two different propelling charges.

FIG. 2 shows a further embodiment of a pyrotechnical gas generator with two different main propelling charges comprised in a charge container. Parts, which are the same as the parts illustrated in FIG. 1 are indicated by reference numerals increased by 100. Only the differences between the embodiment of FIG. 2 and that of FIG. 1 are described.

In the case of the embodiment, depicted in FIG. 2, of a pyrotechnical gas generator 110 the propelling charge 116' with a lower speed of combustion is constituted by the internal tube 128 itself. In this case this internal tube 128 consists of a solid propelling charge.

Furthermore the charge receiving container 126 preferably consists of plastic material. It is preferably manufactured integrally with an annular base 140, which extends from the bottomwall 138 inward and surrounds the central aperture 132 in the groundwall 138, which is normally sealed by the blowout diaphragm 130. The annular base 140 is coaxial in relation to the cylindrical housing 112 and is aligned with the ignition channel 136, which is opposite to the other end of the propelling charge container 126. The internal tube 128 constituting the propelling charge 116' with a lower speed of combustion has its two ends inserted in the annular base 140 and, respectively, in the ignition channel 136 so that it is set and aligned coaxially to the cylindrical housing 112, the propelling charge container 126 and the ignition channel 136 of the ignitor 114. While the end, secured in the annular base 140, of the internal tube 128 is in positive interlock with the blow-out diaphragm 130 and sealed by it, the end 134 inserted into the ignition channel 136 is at a distance e from the booster 148, which just like the embodiment in accordance with FIG. 1 causes an explosion-like ignition of the propelling charge 116' with a lower speed of combustion.

In the case of this embodiment as well shown in FIG. 2 the ignitor 118 is firstly only utilized to ignite the propelling charge 116' with the lower speed of combustion, which in the present case is constituted by the internal tube 128 itself. This internal tube 128 consisting of solid charge burns through relatively slowly so that during a first phase the pressure produced increases again relatively slowly. After the internal tube 128 has burned through, the charge 116" with the higher speed of combustion is ignited, which in the following phase causes a more rapid drive of the restraining system. This restraining system is again more particularly a pretensioner for a safety belt system. Such a pretensioner device may for example be arranged on a belt retractor and also on a belt buckle.

Figure 3:
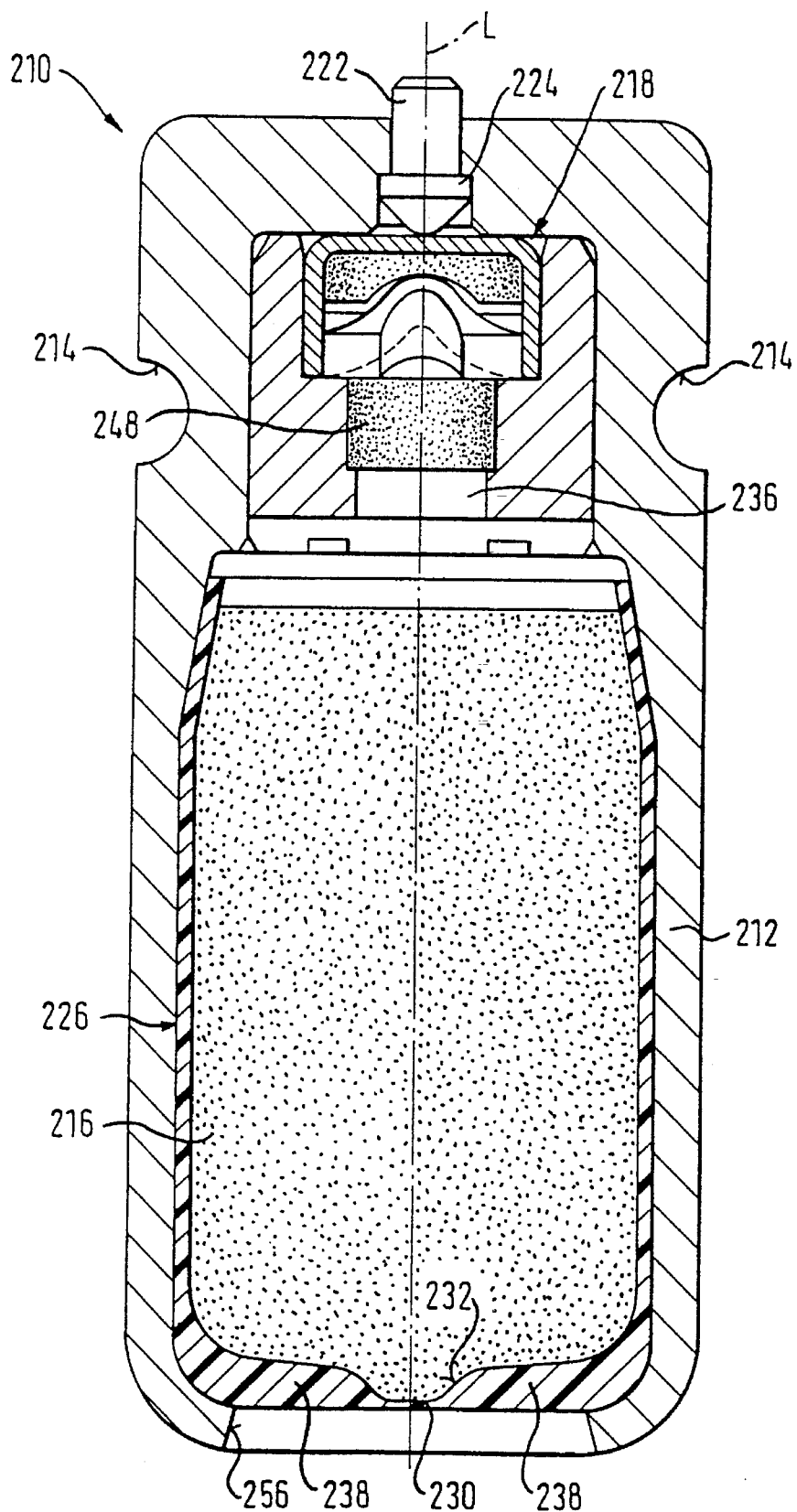
FIG. 3 is an axial section taken through an embodiment of a pyrotechnical gas generator with a graded floor.

FIG. 3 shows an embodiment of a pyrotechnical gas generator 210, whose bowl-like and preferably plastic material propelling charge receiving envelope 226 is provided with a graded bottom and has only one main propelling charge 216. The parts, which correspond to those of the embodiment in accordance with FIG. 1 are referenced with numerals increased by 200. Again only the differences between the embodiment of FIG. 2 and that of FIG. 3 are described.

In the case of this design of a pyrotechnical gas generator 210 illustrated in FIG. 3 there is no internal tube as employed in the two preceding embodiments of the invention. There is merely one propelling charge 216 in the propelling charge container 226.

The aperture 232 provided in the bottomwall 238 and normally sealed by the blow-out diaphragm 230 has a cross section which decreases toward the outside. The thin blow-out diaphragm 230 closes this aperture 232 in the outer part with the minimum diameter. The bottomwall 238, containing the blow-out diaphragm 230, of the propelling charge receiving means 226 is arranged opposite to the end of this envelope 226 adjacent to the ignitor. The aperture 232 is arranged centrally in the bottomwall 238 and accordingly is coaxial both to the cylindrical housing 212 and to the envelope 226. In the cylindrical housing 212 of the gas generator 210 the ignitor 218 and the envelope 226 are again arranged coaxially to the longitudinal axis L of the housing 212 in tandem.

In this embodiment, depicted in FIG. 3, of a pyrotechnical gas generator 210 with an envelope 226 having a variable thickness bottomwall 238 a crash of the vehicle will mean that the propelling charge 216 will be ignited by the ignitor 218 and the booster 248. Immediately after this a corresponding increase in pressure within the envelope 226 will rupture the thin blow-out diaphragm 230 so that a relatively small hole will be opened up. Accordingly there is initially a relatively slow increase in pressure. It is only when the small hole has been increased in size by the burning action that the increase in pressure will become steeper, such hole becoming wider in the course of time in accordance with the configuration of the internal wall surface of the aperture 232. By having a suitable design of this variable thickness bottomwall it is hence possible to determine the desired pressure increase function.

Figure 4:
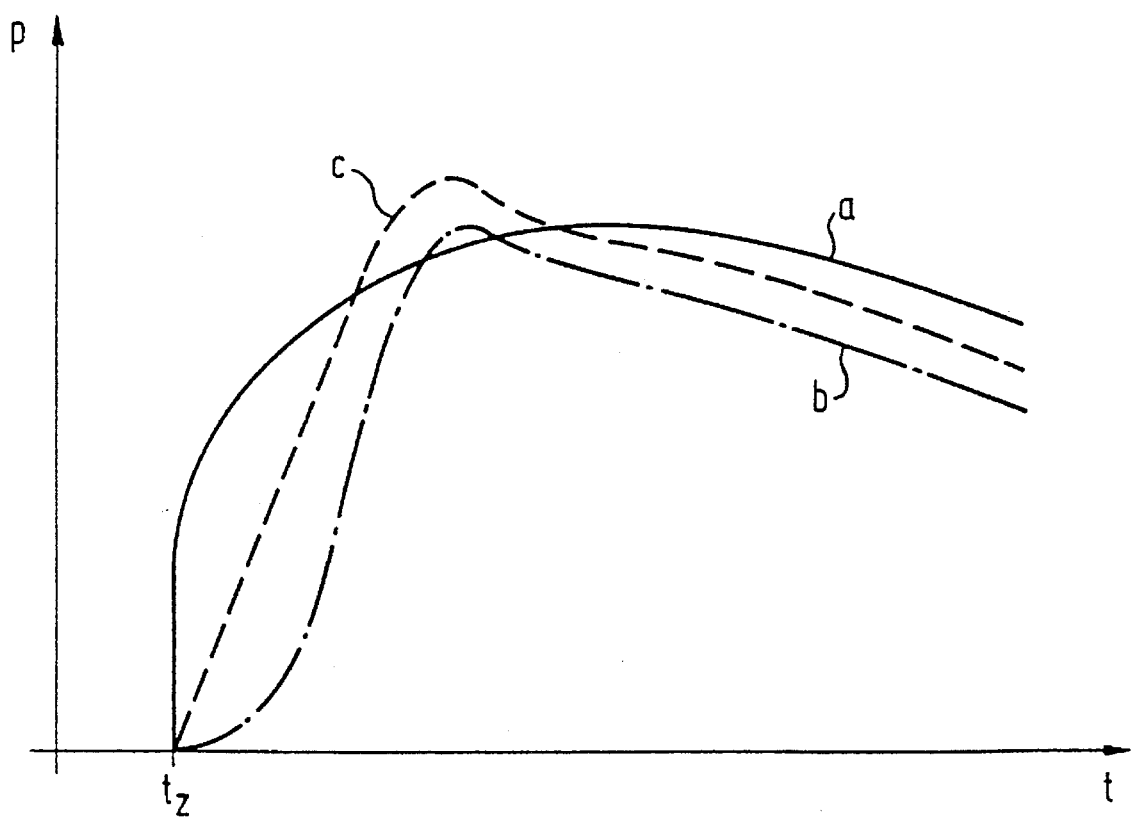
FIG. 4 is a graph of pressure against time for the gas generators depicted in FIGS. 1 through 3 in comparison with a conventional gas generator.

The curve a) in FIG. 4 shows the pressure against time function of a conventional pyrotechnical gas generator. In accordance with this there is a relatively steep increase in pressure directly following the point $t_z$ in time of ignition, which is followed by a period, whose slope continuously decreases until the peak value is reached. After this the pressure p will become less again with time t.

The curve b) in FIG. 4 shows a pressure time function as may be obtained using a pyrotechnical gas generator in accordance with the invention. It will be seen from this that following the point $t_z$ in time of ignition there is firstly a relatively slow increase in pressure. This initial phase with a relatively flat increase in pressure is followed by a phase with a relatively steep increase in pressure, during which there is a rapid drive of the respective restraining system. Once the peak has been reached, the pressure values will decrease with time again.

By having a suitable design of the gas generator it is also possible to provide such a pressure function as is indicated in FIG. 4 by curve c). In this case a continuous increase in pressure is achieved as far as reaching the peak, such increase in pressure being less than the initial increase in pressure in the case of a conventional gas generator (see curve a)) and being larger than the initial increase in pressure in accordance with curve b). The peak value is larger than in the two preceding cases a) and b).

Owing to the reduction of the initial pressure the stress on the mechanical components of the restraining system is substantially reduced so that the danger of damage and/or impairment of the components acted upon by the pressure is kept low. The pyrotechnical gas generator in accordance with the invention is more particularly advantageous in connection with a pretensioner of a safety belt system, such pre-tensioner being able to be arranged both on a belt retractor and also on a belt buckle.

What is claimed is:

1. A gas generator for a vehicle occupant restraint system, comprising a housing, a first pyrotechnical charge accomodated in a first chamber defined within said housing, a second pyrotechnical charge accomodated in a second chamber defined within said housing, and an ignitor accomodated in a third chamber defined in said housing and communicating with said first chamber, said first pyrotechnical charge having a velocity of combustion lower than that of said second pyrotechnical charge, and said first and second chambers being separated from each other by a consumable partition wall which is destroyed upon combustion of said first pyrotechnical charge.

2. The gas generator of claim 1, wherein said housing has a bottom opposed to said third chamber and provided with an opening, said opening being closed by a blow-out diaphragm.

3. The gas generator of claim 1, wherein said partition wall is tubular, said second chamber coaxially surrounding said first chamber.

4. The gas generator of claim 3, wherein said tubular partition wall has a first end communicating with said third chamber and a second end closed by a blow-out diaphragm.

5. The gas generator of claim 3, wherein said tubular partition wall is integrally formed with a container surrounding said second chamber.

6. The gas generator of claim 5, wherein said blow-out diaphragm is integrally formed with said container.

7. The gas generator of claim 3, wherein said tubular partition wall is formed of a pyrotechnical material.

8. A gas generator for a vehicle occupant restraint system, comprising a housing, an envelope accomodated in said housing, a pyrotechnical charge accomodated in said envelope, and an ignitor accomodated in a chamber of said housing communicating with said envelope, said housing having a bottom opposite said chamber and closed by a blow-out diaphragm, and said blow-out diaphragm having a first, relatively thin wall portion and a second wall portion of a substantially greater wall thickness than said first wall portion.

9. The gas generator of claim 8, wherein said blow-out diaphragm is integrally formed with said envelope.

10. The gas generator of claim 8, wherein said first wall portion is surrounded by said second wall portion.

11. The gas generator of claim 8, wherein said first and second wall portions are interconnected by an intermediate wall portion of varying wall thickness.

\* \* \* \* \*